United States Patent
Siddiqui et al.

(10) Patent No.: US 10,750,135 B2
(45) Date of Patent: Aug. 18, 2020

(54) HARDWARE-FRIENDLY MODEL-BASED FILTERING SYSTEM FOR IMAGE RESTORATION

(71) Applicant: QUALCOMM Incorporated, San Diego, CA (US)

(72) Inventors: Hasib Siddiqui, San Diego, CA (US); Kalin Atanassov, San Diego, CA (US); Magdi Mohamed, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 12 days.

(21) Appl. No.: 16/165,881

(22) Filed: Oct. 19, 2018

(65) Prior Publication Data

US 2020/0128216 A1    Apr. 23, 2020

(51) Int. Cl.
*H04N 9/04*    (2006.01)
*G06T 5/20*    (2006.01)
*H04N 9/64*    (2006.01)
*G06T 5/00*    (2006.01)

(52) U.S. Cl.
CPC .......... *H04N 9/04515* (2018.08); *G06T 5/20* (2013.01); *H04N 9/04551* (2018.08); *H04N 9/646* (2013.01); *G06T 5/002* (2013.01); *G06T 5/003* (2013.01); *G06T 5/006* (2013.01); *G06T 2207/20024* (2013.01); *G06T 2207/20084* (2013.01); *H04N 2209/046* (2013.01)

(58) Field of Classification Search
CPC .......... H04N 9/04515; H04N 9/04551; H04N 9/646; H04N 2209/046; G06T 5/20; G06T 5/003; G06T 5/002; G06T 5/006; G06T 2207/20084; G06T 2207/20024
See application file for complete search history.

(56) References Cited

U.S. PATENT DOCUMENTS

| | | | |
|---|---|---|---|
| 2007/0058050 A1* | 3/2007 | Innocent ................ | H04N 9/045 348/222.1 |
| 2010/0092082 A1* | 4/2010 | Hirakawa ............. | G06T 3/4015 382/167 |
| 2011/0090242 A1* | 4/2011 | Cote ..................... | G06T 3/4015 345/597 |
| 2011/0314253 A1* | 12/2011 | Jacob (Yaakov) ........ | G06T 1/60 711/220 |

* cited by examiner

*Primary Examiner* — Mekonnen D Dagnew
(74) *Attorney, Agent, or Firm* — Holland & Hart LLP

(57) ABSTRACT

A device (e.g., an image sensor, camera, etc.) may identify a camera lens and color filter array (CFA) sensor used to capture an image, and may determine filter parameters (e.g., a convolutional operator) based on the identified camera lens and CFA sensor. For example, a set of kernels (e.g., including a set of horizontal filters and a set of vertical filters) may be determined based on properties of a given lens and/or q-channel CFA sensor. Each kernel or filter may correspond to a row of a convolutional operator (e.g., of a restoration bit matrix) used by an image signal processor (ISP) of the device for non-linear filtering of the captured image. The corresponding outputs from the horizontal and vertical filters (e.g., two outputs of the horizontal and vertical filters corresponding to an input channel associated with the CFA sensor) may then be combined using a non-linear classification operation.

20 Claims, 9 Drawing Sheets

HARDWARE-FRIENDLY MODEL-BASED FILTERING SYSTEM FOR IMAGE RESTORATION

BACKGROUND

The following relates generally to image processing, and more specifically to a hardware-friendly model-based filtering system for image restoration.

A device may include an optical instrument (e.g., an image sensor, camera, etc.) for recording or capturing images, which may be stored locally, transmitted to another location, etc. For example, an image sensor may capture visual information using one or more photosensitive elements that may be tuned for sensitivity to a visible spectrum of electromagnetic radiation. The resolution of such visual information may be measured in pixels, where each pixel may relate an independent piece of captured information. In some cases, each pixel may thus correspond to one component of, for example, a two-dimensional (2D) Fourier transform of an image. Computation methods may use pixel information to reconstruct images captured by the device.

For example, accurate reproduction of the true color(s) in a scene may be based on processing of pixel values for one or more image arrays (e.g., or local patches of a total image array) representing the scene. For example, an image sensor may include a lens for capturing visual information through a color filter array (CFA) and onto a sensor (e.g., pixel sensor units). The sensor, or camera, may thus be operable to capture optical information filtered through the CFA (e.g., each pixel sensor unit may receive color-specific image information due to the CFA between the lens and the sensor). The device may additionally include an image signal processor (ISP) which may be operable to process the filtered optical information and restore the image (e.g., the image color). In some scenarios, these processing techniques may be time consuming and computationally intensive. Improved image restoration techniques may be desired.

SUMMARY

The described techniques relate to improved methods, systems, devices, or apparatuses that support hardware-friendly model-based non-linear filtering systems for image restoration. For example, the described techniques may provide for non-iterative maximum a posteriori (NMAP) universal demosaicking based on offline filter parameter (e.g., convolutional operator, reconstruction matrix, etc.) determination.

A device (e.g., an image sensor, camera, etc.) may identify a camera lens and color filter array (CFA) sensor used to capture an image, and may determine filter parameters (e.g., a convolutional operator) based on the identified camera lens and CFA sensor. For example, the device may identify one or more properties associated with the camera lens or the CFA sensor, such as a lens point spread function (PSF), a lens chromatic aberration parameter, a sensor pixel PSF, a sensor crosstalk parameter, a sensor spectral overlap parameter, etc. The device may then identify filtering or tuning parameters for each filter of a set of horizontal filters and a set of vertical filters. For example, a set of kernels (e.g., including a set of horizontal filters and a set of vertical filters) may be determined based on properties of the lens and/or properties of the camera. Each kernel or filter may correspond to a row of a convolutional operator (e.g., of a bit matrix) used by an image signal processor (ISP) of the device for non-linear filtering of the captured image. The corresponding outputs from the horizontal and vertical filters (e.g., two outputs, one from a horizontal and one from a vertical filter, corresponding to an input channel associated with the CFA sensor) may then be combined using a non-linear classification operation, which may ultimately provide a non-iterative mechanism for reconstructing or restoring the image captured by the CFA sensor.

A method of image processing is described. The method may include identifying a camera lens and a CFA sensor and determining a convolutional operator based on the camera lens and the CFA sensor. The method may further include identifying a pixel array representing an image, filtering a local patch of the pixel array using a set of horizontal filters and a set of vertical filters based on the convolutional operator, combining at least two results of the filtering based on a non-linear classification operation, and outputting a restored image based on the combining.

An apparatus for image processing is described. The apparatus may include a processor, memory in electronic communication with the processor, and instructions stored in the memory. The instructions may be executable by the processor to cause the apparatus to identify a camera lens and a CFA sensor and determine a convolutional operator based on the camera lens and the CFA sensor. The instructions may be executable by the processor to further cause the apparatus to identify a pixel array representing an image, filter a local patch of the pixel array using a set of horizontal filters and a set of vertical filters based on the convolutional operator, combine at least two results of the filtering based on a non-linear classification operation, and output a restored image based on the combining.

Another apparatus for image processing is described. The apparatus may include means for identifying a camera lens and a CFA sensor, determining a convolutional operator based on the camera lens and the CFA sensor, identifying a pixel array representing an image, filtering a local patch of the pixel array using a set of horizontal filters and a set of vertical filters based on the convolutional operator, combining at least two results of the filtering based on a non-linear classification operation, and outputting a restored image based on the combining.

A non-transitory computer-readable medium storing code for image processing is described. The code may include instructions executable by a processor to identify a camera lens and a CFA sensor, determine a convolutional operator based on the camera lens and the CFA sensor, identify a pixel array representing an image, filter a local patch of the pixel array using a set of horizontal filters and a set of vertical filters based on the convolutional operator, combine at least two results of the filtering based on a non-linear classification operation, and output a restored image based on the combining.

In some examples of the method, apparatuses, and non-transitory computer-readable medium described herein, filtering the local patch of the pixel array may include operations, features, means, or instructions for filtering a set of red, green, blue values through the set of horizontal filters to produce a first red value, a first green value, and a first blue value, and filtering the set of red, green, blue values through the set of vertical filters to produce a second red value, a second green value, and a second blue value.

In some examples of the method, apparatuses, and non-transitory computer-readable medium described herein, combining at least two results of the filtering further may include operations, features, means, or instructions for combining the first red value and the second red value based on the non-linear classification operation, combining the first green value and the second green value based on the non-linear classification operation, and combining the first blue value and the second blue value based on the non-linear classification operation. In some examples of the method, apparatuses, and non-transitory computer-readable medium described herein, the non-linear classification operation may be based on an edge orientation associated with the local patch.

Some examples of the method, apparatuses, and non-transitory computer-readable medium described herein may further include operations, features, means, or instructions for identifying a second camera lens, a second CFA sensor, or both, and modifying the convolutional operator based on the second camera lens, the second CFA sensor, or both. In some examples of the method, apparatuses, and non-transitory computer-readable medium described herein, modifying the convolutional operator may include operations, features, means, or instructions for updating hardware registers in an ISP. In some examples of the method, apparatuses, and non-transitory computer-readable medium described herein, the filtering may be based on the modified convolutional operator.

In some examples of the method, apparatuses, and non-transitory computer-readable medium described herein, determining the convolutional operator further may include operations, features, means, or instructions for identifying a tuning parameter for each filter of the set of horizontal filters and the set of vertical filters based on one or more properties associated with the camera lens or the CFA sensor, where the one or more properties include one or more of a lens PSF, a lens chromatic aberration parameter, a sensor pixel PSF, a sensor crosstalk parameter, a sensor spectral overlap parameter, or some combination thereof.

In some examples of the method, apparatuses, and non-transitory computer-readable medium described herein, the determination of the convolutional operator may be based on a correction including one or more of a chromatic aberration correction, a blurring correction, a cross talk correction, or some combination thereof, where the correction may be associated with the camera lens or the CFA sensor.

DETAILED DESCRIPTION

Figure 1:
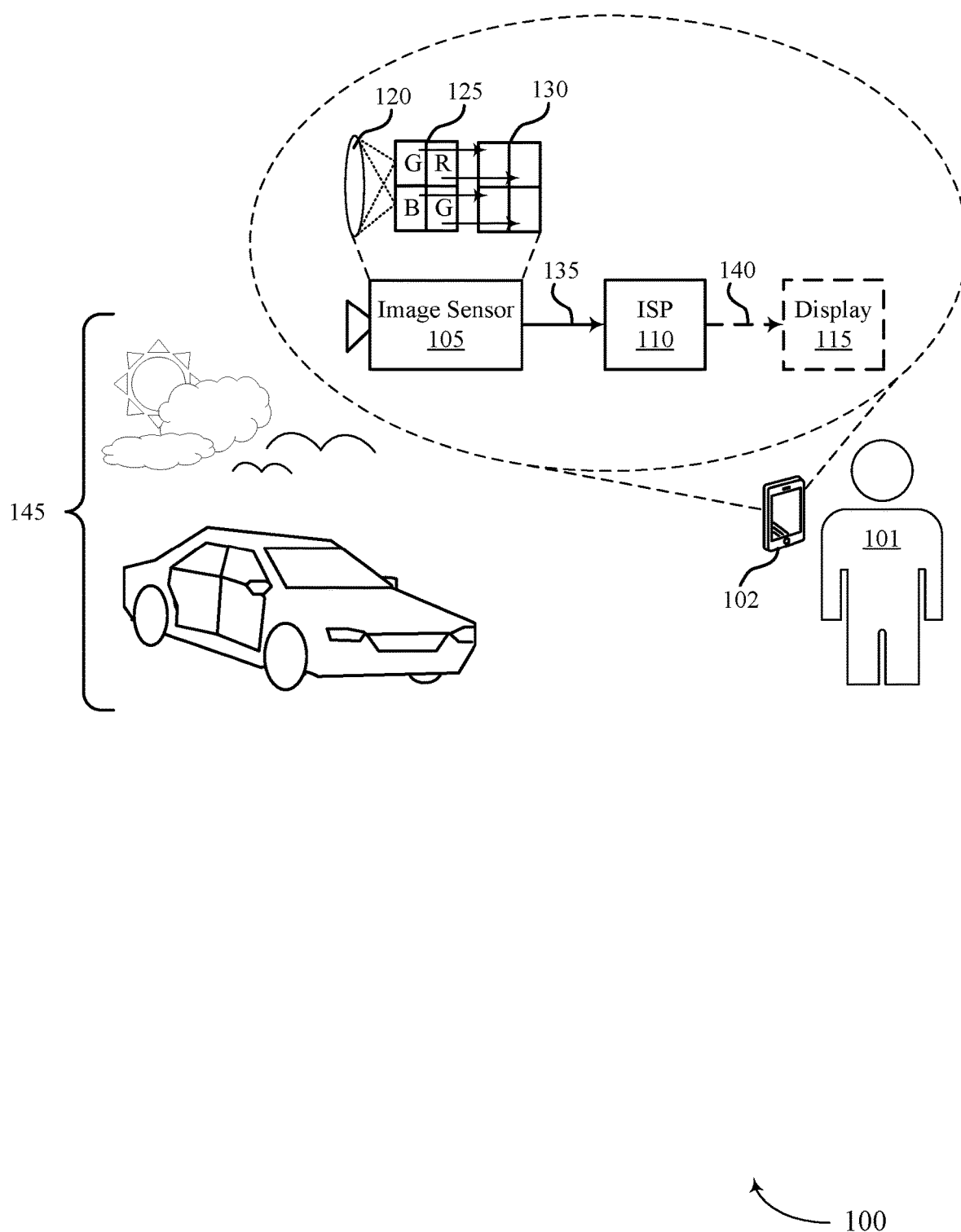
FIG. 1 illustrates an example of a system for image processing that supports hardware-friendly model-based filtering systems for image restoration in accordance with aspects of the present disclosure.

An image sensor may capture visual information using one or more photosensitive elements that may be tuned for sensitivity to a visible spectrum of electromagnetic radiation. An imaging device (e.g., an image sensor, camera, video recorder, mobile device, computer, etc.) may use an image signal processor (ISP) to restore images from captured raw data. An ISP may implement computation methods utilizing pixel information to reconstruct or restore images captured by a sensor of the device. For example, an ISP may use a technique called demosaicking to reconstruct a full-color image from spatially under sampled color channel outputs from an image sensor overlaid with a color filter array (CFA). Other image restoration techniques performed by an ISP may include fixed pattern denoising (e.g., to correct sensor crosstalk), CFA interpolation (e.g., to correct for missing color components), chromatic aberration correction (e.g., to correct for lens related aberrations), chroma denoising and desaturation (e.g., to correct for artifacts related to sensor spectral overlap), deblurring (e.g., to correct for blurring artifacts related to lens point spread function (PSF)), etc.

In some cases, an ISP may be tuned (e.g., or designed) for the specific camera (e.g., for the lens, CFA sensor, etc. used by the device). Further, in some examples, an ISP may include multiple image processing units to perform the various techniques for restoring images from raw data. For example, an ISP may include separate processing modules for performing fixed pattern denoising, CFA interpolation, chromatic aberration correction, chroma denoising and desaturation, deblurring, etc. As such, each of the multiple image processing modules may be designed or tuned for a certain CFA sensor and lens pair, resulting in ISP retuning challenges whenever the sensor/lens pair in the camera module changes. Individual design or tuning of the various image processing modules (e.g., due to implementation of different CFA sensor/lens combinations) may result in theoretically sub-optimal performance, and may be time consuming or computationally intensive.

The techniques described herein may provide for a hardware-friendly model-based non-linear filtering system for image restoration. For example, the described techniques may provide for non-iterative maximum a posteriori (NMAP) universal demosaicking based on offline filter parameter determination. Non-linear filter parameters of a convolution operator (e.g., modeling CFA sampling performed by the sensor and various distortions introduced by the camera lens and the sensor) may be determined using maximum a posteriori (MAP)-based restoration. For example, for a three channel CFA sensor, the convolution operator may be used to filter a raw image with a bank of six linear kernels, including three horizontal filters and three vertical filters. The filtered output associated with each channel of the CFA sensor (e.g., from the horizontal filters and the vertical filters) may then be combined using a non-linear classifier to yield the final restored image. The filtering parameters may be determined offline based on the camera or image sensor (e.g., based on the lens, CFA sensor, etc.), such that the ISP may be efficiently configured for different camera or image sensor configurations. The proposed non-linear filtering systems may achieve multiple image processing tasks such as, for example, demosaicking, chroma denoising, color desaturation, lens deblurring, fixed pattern noise reduction due to sensor cross talk, chromatic aberration correction, etc. Further, the described filtering system may provide for improved hardware configurability (e.g., as filters may be easily configured to demosaick any Bayer/non-Bayer CFA data), improved tuning efficiency for specific cameras (e.g., as filters may be tuned offline using lens and sensor specifications), and improved image restoration.

Aspects of the disclosure are initially described in the context of an image reconstruction system. Example devices and process flows implementing the described image reconstruction techniques are then discussed. Aspects of the disclosure are further illustrated by and described with reference to apparatus diagrams, system diagrams, and flowcharts that relate to hardware-friendly model-based non-linear filtering systems for image restoration.

FIG. 1 illustrates an example of a system 100 (e.g., an image signal processing system, an image restoration system, etc.) that supports a hardware-friendly model-based non-linear filtering system for image restoration in accordance with aspects of the present disclosure. System 100 may include a device 102 that includes an image sensor 105 (e.g., a camera) in electronic communication with an ISP 110 (e.g., some image signal processor and/or image signal processing software). In some cases, the ISP 110 may be in electronic communication with a display 115 (e.g., for displaying a reconstructed image). System 100 includes a user 101 of the device 102 capturing an image of some scene 145 using an image sensor 105 of the device 102. The image sensor 105 may include a lens 120, a CFA 125, and pixel sensor array 130, which may collect (e.g., focus), filter, and detect lighting information. The lighting information may be passed, via link 135, to ISP 110 (e.g., for processing and reconstruction of the raw image data). In some examples, the restored image information (e.g., determined or output from the ISP 110) may then be passed to a display 115 of the device, via link 140. In other examples, the restored image information may be stored by the device, passed to another device, etc.

Techniques described with reference to aspects of system 100 are done so for exemplary purposes only, and are not intended to be limiting in terms of the applicability of the described techniques. That is, the techniques described may be implemented in, or applicable to, other imaging examples (e.g., other examples of image sensor or camera based applications), without departing from the scope of the present disclosure. For example, the techniques described may generally provide for an efficient and universal demosaick algorithm for recovering or restoring full-resolution spectral channels from arbitrary q-channel raw CFA images.

As used herein, a device 102 may refer to any device with a camera, image sensor, light sensor, etc. In some cases, device 102 may refer to a camera, a mobile device, a wireless device, a remote device, a handheld device, a subscriber device, a personal electronic device such as a cellular phone, a personal digital assistant (PDA), a tablet computer, a laptop computer, a personal computer, or some other suitable terminology. Further examples of devices 102 that may implement one or more aspects of hardware-friendly model-based non-linear filtering system for image restoration techniques may include camcorders, webcams, computer monitors, cockpit controls and/or displays, camera view displays (such as the display of a rear-view camera in a vehicle), etc.

Any of such devices may include at least one light sensor (e.g., image sensor 105) that outputs a signal, or information bits, indicative of light (e.g., reflective light characteristics of scene 145, light emitted from scene 145, an amount or intensity of light associated with scene 145, red green blue (RGB) values associated with scene 145, etc.). For example, the image sensor may include a lens 120 (e.g., to capture or focus incoming light), a CFA 125 (e.g., to filter the incoming light according to different individual filter elements of the CFA), and pixel sensor array 130 (e.g., to detect or measure the filtered light). The image sensor 105 may then signal or pass information collected by the pixel sensor array 130 to ISP 110 over link 135. The ISP 110 (e.g., one or more driver circuits for image processing) may then process the information collected by the image sensor 105 (e.g., to reconstruct or restore the captured image of scene 145). In some cases, ISP 110 may refer to a general central processing unit (CPU), a dedicated piece of hardware, a system on chip (SoC), etc. Further, the device 102 may include electrical connections associated with the image sensor 105, the one or more drivers (e.g., the ISP 110), the display 115, etc., and may provide connections between the image sensor 105 and ISP 110 (e.g., and in some cases also between the display 115). In some examples, a general processor of the device may perform aspects of the ISP 110.

In some cases, image sensor 105 may refer to a complementary metal oxide semiconductor (CMOS) image sensor, a charge-coupled device (CCDs), etc. used in digital imaging applications to capture images (e.g., scenes 145). An image sensor 105 may include an array of sensors (e.g., such as pixel sensor array 130). Each sensor in the pixel sensor array 130 may include at least one photosensitive element for outputting a signal having a magnitude proportional to the intensity of incident light or radiation contacting the photosensitive element. When exposed to incident light reflected or emitted from a scene 145, each sensor in the pixel sensor array 130 may output a signal having a magnitude corresponding to an intensity of light at one point in the scene 145 (e.g., at an image capture time). The signals output from each photosensitive element may be processed (e.g., by the ISP 110) to form an image representing the captured scene. In general, a pixel brightness measurement or a pixel value from an image sensor 105 (e.g., from pixel sensor array 130) may correspond to a pixel intensity value, RGB values of a pixel, infrared values of a pixel, or any other parameter associated with light (e.g., or the image being captured, the picture being taken, etc.). Pixel sensor array 130 may include one or more photosensitive elements for measuring such information. In some examples, the photosensitive elements may have a sensitivity to a spectrum of electromagnetic radiation (e.g., including the visible spectrum of electromagnetic radiation, infrared spectrum of electromagnetic radiation, etc.). For example, the at least one photosensitive element may be tuned for sensitivity to a visible spectrum of electromagnetic radiation (e.g., by way of depth of a photodiode depletion region associated with the photosensitive element).

Further, the image sensor 105 may include a CFA 125 which may filter light captured by the lens 120 of the image sensor 105 according to the one or more filters associated with the CFA 125. An image may be projected through the lens 120 onto the pixel sensor array 130. Each pixel sensor of the pixel sensor array 130 may measure light information filtered through a filter element of the CFA 125 (e.g., elements of the CFA 125 may each correspond to, or overlay, an element of the pixel sensor array 130, such that each element of the pixel sensor array 130 is exposed to light information passed through different respective filter elements of the CFA 125). To capture color images, photo sensitive elements may separately detect wavelengths of light associated with different colors. For example, pixel sensor array 130 may be designed to detect first, second, and third colors (e.g., red, green, and blue wavelengths). To accomplish this, each sensor or pixel unit in the pixel sensor array 130 may be covered with a single color filter (e.g., a red, green or blue filter). The single color filters may be arranged into a pattern to form the CFA 125 over the pixel sensor array 130 such that each individual filter in the CFA 125 is aligned with one individual sensor in the pixel sensor array 130. Accordingly, each sensor in the pixel sensor array 130 may detect the single color of light corresponding to the filter aligned with it.

One example of a CFA 125 pattern is the Bayer CFA, where the array portion consists of rows of alternating red and green color filters and alternating blue and green color filters. Each color filter corresponds to one sensor in an underlying pixel sensor array 130. In a Bayer CFA, half of the color filters are green color filters, one quarter of the color filters are blue color filters, and one quarter of the color filters are red color filters. The use of twice as many green filters as red and blue filters, respectively, may imitate the human eye's greater ability to see green light than red and blue light. In some arrangements, each sensor in the Bayer CFA is sensitive to a different color of light than its closest neighbors disposed in a horizontal and vertical arrangement in the array. For example, the nearest neighbors to each green filter are red and blue filters, the nearest neighbors to each red filter are green filters, and the nearest neighbor to each blue filter are green filters. Because each filter's closest neighbors have different color designations than it, each filter overlies only one corresponding sensor. Color filter material may consist of dyes, or more commonly pigments, to define the spectrum of the color filter. In some cases, the size of each color filter may correspond to the size of the sensor (e.g., a 1:1 ratio).

The CFA 125 may mask pixel sensor array 130 in order to filter radiation and allow only a specific range of wavelengths, such that each individual filter included in the CFA 125 allows the corresponding sensors to be exposed to only a specific range of the electromagnetic spectrum, based on the configuration of the individual filters. Example implementations of the techniques disclosed herein may be described using the Bayer filter configuration discussed above, where the RGB color filters limit the light exposed to the sensors to RGB wavelength regions. This example should not be read as limiting, as the present invention may comprise alternative configurations of color patterns and size of color filters, as well as filters that allow for passing ranges of electromagnetic frequencies that include infrared, ultra-violet, or other ranges of the electromagnetic spectrum beyond visible light. In general CFA 125 may refer to 3 or more channel CFA sensor (e.g., any arbitrary q-channel CFA sensor), and ISP 110 may implement the described techniques to recover full-resolution spectral channels from arbitrary q-channel raw CFA images from image sensor 105.

For example, some non-Bayer CFA patterns may be associated with improved spectral-compression performance, improved signal-to-noise ratio, improved high dynamic range (HDR) imaging, etc. The use of non-Bayer image sensors that include near infra-red (NIR) and white pixels, in addition to the traditionally used RGB spectral pixels, has become popular for computer vision and low-light imaging. Packing even more spectral bands on a single imaging sensor (e.g., such as the 16/25-band IMEC hyper-spectral imaging mosaic sensor) may open up new applications in areas of robotics, medicine, automotive, and food industry. The described techniques provide for methods or algorithms for reconstructing high-quality images from raw images captured with non-Bayer CFA mosaic sensors. In some cases, demosaicking methods that perform color interpolation of Bayer CFA data may not be effective in recovering full-resolution spectral channels from arbitrary q-channel raw CFA images.

One challenge in developing algorithms for non-Bayer CFA sensors (e.g., image sensors 105 with a non-Bayer CFA 125 and pixel sensor array 130 combination) is the wide variation in the number of spectral bands, the spectral response curve of each band, and the spatial arrangement of the spectral filters constituting the CFA sensor. Therefore, non-Bayer CFA images may be interpolated using sensor-manufacturers' proprietary algorithms, specifically designed to interpolate the CFA patterns that they develop. Spectral interpolation of non-Bayer CFA images using manufacturer-proprietary technology may entail either resampling the non-Bayer CFA data to a Bayer pattern and then performing color interpolation using Bayer demosaick, or using a dedicated demosaick algorithm designed for the specific color sampling pattern. The former solution may result in sub-optimal interpolation and may be limited to demosaicking of 3-channel data. The latter solution may necessitate implementation of a separate demosaick block in the ISP unit for each supported CFA pattern, increasing the silicon area and cost of the imaging hardware.

A universal demosaick algorithm based on MAP estimation may be configured to demosaick raw images captured using any 3 or more channel CFA sensor (e.g., such as CFA 125). The forward process of mosaicking may be modeled as a linear operation. Quadratic data-fitness and image prior model terms may be used in a MAP framework and the inverse matrix may be pre-computed offline for recovering the full multi-channel spectral image from the CFA observations for a given pattern. The pre-computed inverse is later used in real-time application to demosaick the given CFA 125. The inverse matrix for data reconstruction may have a block circulant structure with circulant blocks (BCCB), allowing for computationally efficient implementation of the algorithm.

The universal demosaick algorithm described herein may include a configurable architecture where the filter coefficients may be programmed to perform spectral interpolation of raw data obtained from any q-channel CFA 125. Such may potentially allow an ISP 110 to be fitted at the front-end with any CFA mosaic sensor (e.g., designed for conventional imaging, computer vision, or other application) and may be configured to perform demosaicking with a single CFA interpolation (e.g., non-iterative) hardware module. The filter coefficients for demosaicking the CFA patterns may be optimized offline.

The proposed universal demosaicker may be based on statistical MAP estimation where the forward spatio-spectral sampling process may be modeled as a linear operation. The full-resolution q-channel spectral image may then be estimated from the sparse CFA data by inverting the linear system, while imposing smoothness constraints on the estimated data using Gaussian Markov random field (GMRF) prior image model. The procedure may be adapted to demosaick a new CFA pattern through simple modification of the spatio-spectral sampling operator. Some demosaick algorithms that rely on MAP estimation to recover the unknown RGB pixel values from Bayer CFA observations may involve iteratively solving a set of algebraic equations.

Iterative algebraic methods may be computationally expensive and not suitable for real-time applications. As such, the demosaicker described herein may be based on pre-computing, compressing, and storing the operator for recovering the full q-channel MAP estimate non-iteratively from the captured CFA image.

Specifically, by modeling the sensor noise as Gaussian and image prior model as homogeneous GMRF, the MAP reconstruction operator H may be linear, data independent, and therefore may be estimated a priori only once for a CFA pattern of interest. The reconstruction operator may be determined as a block-circulant matrix with $qp^2 \times qp^2$ circulant blocks (BCCB), where p×p denotes the periodicity of the CFA pattern. Thus, the matrix operator H may represent the application of a set of $qp^2$ space invariant 2-D filters for recovering the MAP estimate. The demosaick filters may have a compact support and may efficiently recover the MAP estimate through non-iterative filtering (e.g., via the determined convolutional operator, reconstruction matrix, etc.).

While the use of quadratic models for data-fitness and prior model terms may lead to linear data-independent MAP reconstruction, the reconstruction filters may be isotropic and cause blurring of object boundaries. A non-quadratic regularization procedure that still allows them to compute filters a priori for a given CFA sensor may overcome this limitation. In other examples, the described techniques may incorporate anisotropicity by proposing a bi-directional demosaicker that seeks two independent reconstructions by using two different homogeneous GMRF prior models. One GMRF model enforces only horizontal smoothness while the other enforces only vertical smoothness in the restored image. The two directional non-iterative MAP (NMAP) reconstructions are then combined using a proposed extension of an adaptive-homogeneity-directed (AHD) classifier to q-channel multispectral images. Such directional filtering followed by AHD-type merging may lead to reduced zipper and color artifacts compared to the weighted least-squares approach. An aspect of the NMAP universal demosaicker is the ease with which it can be tuned to demosaick arbitrary CFA patterns. The 2-D space-invariant directional filter constituting GMRF precision matrices is tuned only once for the Bayer sensor and remains fixed for all other CFA patterns. There is another spatial smoothness parameter selected based on the image noise level. The rest of the parameters for MAP estimation may be derived directly from knowledge of the spatio-spectral sampling process and spectral response curves of the color filters constituting the CFA 125. Once the MAP model parameters are determined, the BCCB structure of the reconstruction matrix may ensure that the offline MAP filter optimization procedure is also efficient.

Figure 2A:
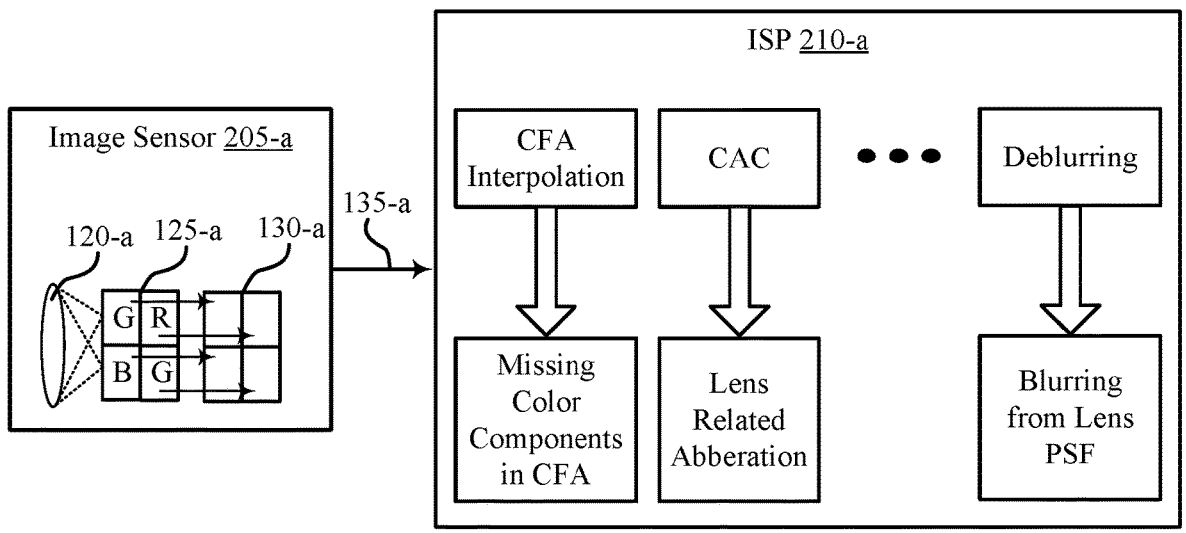
FIGS. 2A and 2B illustrate example systems that support hardware-friendly model-based filtering systems for image restoration in accordance with aspects of the present disclosure.

FIG. 2A illustrates an example of a system 200 that supports image restoration in accordance with aspects of the present disclosure. In some examples, system 200 may implement aspects of system 100. System 200 may include an image sensor 205-a and an ISP 210-a. In some cases, image sensor 205-a and ISP 210-a may be co-located within a device. In other cases, image sensor 205-a and ISP 210-a may be located in separate devices.

ISP 210-a may include multiple image processing units to correct or restore an image. For example, ISP 210-a may include several spatial image processing modules and may perform fixed pattern denoising, CFA interpolation, chromatic aberration correction, chroma denoising and desaturation, deblurring, etc. using individual processing modules (e.g., different restoration techniques may be performed by the ISP 210-a using different software, circuitry, etc.). Each processing unit may be designed to correct or estimate a specific undesired effect. For example, ISP 210-a may have individual processing modules for CFA interpolation (e.g., to correct for missing color components), chromatic aberration correction (CAC) (e.g., to correct for lens related aberrations), deblurring (e.g., to correct for blurring artifacts related to lens PSF), etc. As such, each individual model may be tuned to the to account for different affects arising from the hardware used to collect the raw data. When one module is tuned, other modules may be retuned such that an iterative tuning process may be required to optimize the combination of processing modules, costing additional computational resources. That is, a CFA interpolation module may correct for missing color components (e.g., due to characteristics of the camera hardware used to capture the image), and the corrected image information may be used by the CAC module to correct for lens related aberrations. Thereafter, the corrected image information from the CAC module may be passed to other modules, or in some cases even back to the CFA interpolation module to repeat the missing color component corrections using the partially restored image information. Such may repeat in an iterative fashion to restore the image and correct for lens/CFA sensor distortions across the several modules of ISP 210-a.

For example, the distortions introduced by a specific CFA sensor and lens combination may be unique. The parameters of an ISP 210-a (e.g., the one or modules of ISP 210-a) may need to be tuned (and then retuned) for each scenario to restore an image captured by the CFA sensor and lens combination. This retuning may result in time consuming and computationally expensive iterative algebraic methods in situations in which two or more different imaging systems may be utilized. Moreover, the individual design or tuning of the various image processing modules of ISP 210-a may result in theoretically sub-optimal performance.

Figure 2B:
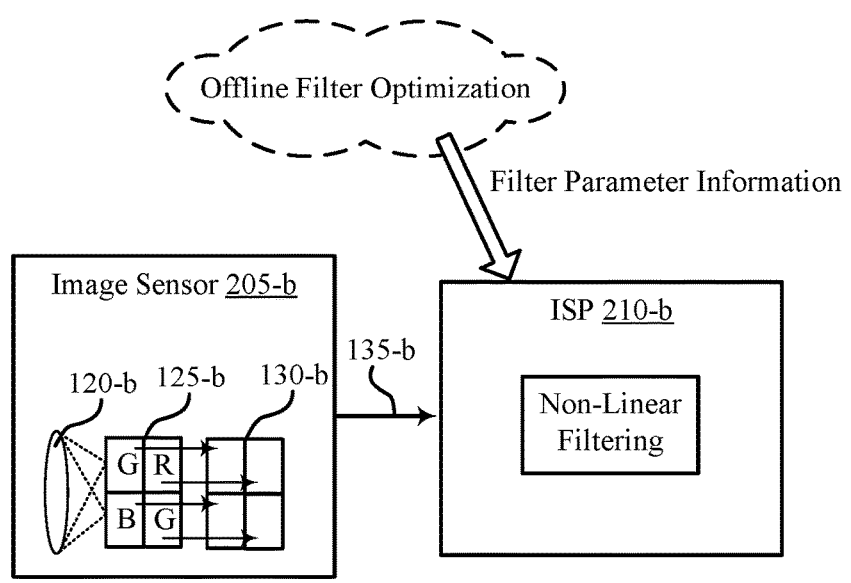

FIG. 2B illustrates an example of a system 201 that supports hardware-friendly model-based filtering systems for image restoration in accordance with aspects of the present disclosure. In some examples, system 201 may implement aspects of system 100. System 201 may include an image sensor 205-b and an ISP 210-b. In some cases, image sensor 205-b and ISP 210-b may be co-located within a device. In other cases, image sensor 205-b and ISP 210-b may be located in separate devices. System 201 may implement techniques described herein for hardware-friendly model-based non-linear filtering via NMAP universal demosaicking based on offline filter optimization. That is, system 201 may provide for a single-pass filtering system where ISP 210-b may execute multiple image processing tasks (e.g., such as CFA interpolation, fixed pattern and chroma denoising, CAC correction, deblurring, color desaturation, etc.) in a single non-linear filtering module.

System 201 may employ offline filter optimization (e.g., sensor/lens characterization) that may involve modeling of certain effects (e.g., or distortions) caused by image sensor 205-b (e.g., due to the lens 120-b, sensor array 130-b, sampling by the CFA 125-b, etc.). The filter (e.g., the convolution operator, the set of kernels, the set of horizontal and vertical filters, the restoration matrix H, etc.) may be optimized by combining a system model (e.g., based on the sensor/lens/CFA combination) and an image prior model (e.g., based on the raw image data), as further described with reference to FIGS. 3 and 5. The optimized filter may be used to non-linearly filter the raw image data to produce a final restored image in a non-iterative fashion (e.g., as further described with reference to FIG. 4). In some cases, system 201 may involve fewer iterations through the filtering system and fewer rounds of tuning in contrast to system 200, and may save time and computational resources. The non-linear processing module (e.g., as a single piece of hardware in ISP 210-b) may further achieve similar or better results compared to performing image processing tasks individually (e.g., as performed by ISP 210-a), may provide reduced computational cost and better quality in the final restored image, and may save time otherwise spent tuning individual image processing units. Further, manufacturing costs associated with the ISP 210-b may also be reduced, as the ISP 210-b may perform the CFA interpolation, fixed pattern and chroma denoising, CAC correction, deblurring, color desaturation, etc. using the single piece of hardware (e.g., the non-linear filtering module).

Figure 3:
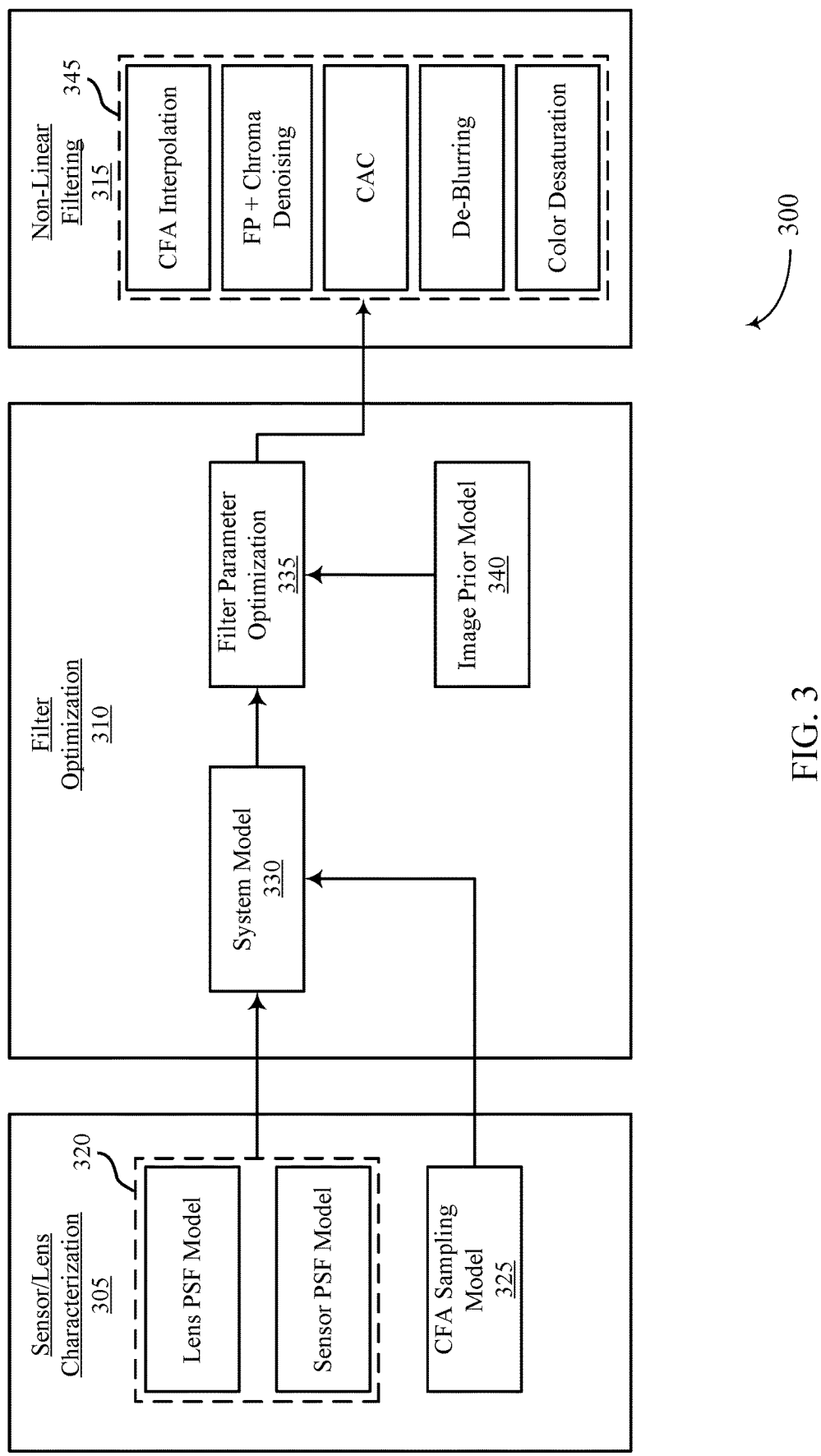
FIG. 3 illustrates an example of a process flow that supports hardware-friendly model-based filtering systems for image restoration in accordance with aspects of the present disclosure.

FIG. 3 illustrates an example of a process flow 300 that supports hardware-friendly model-based filtering systems for image restoration in accordance with aspects of the present disclosure. In some examples, process flow 300 may implement aspects of system 100. Process flow 300 may include a sensor/lens characterization process 305, a filter optimization process 310, and a non-linear filtering process 315. In some cases, process flow 300 may be implemented by a device (e.g., including an image sensor and an ISP), as described herein. For example, sensor/lens characterization process 305, a filter optimization process 310, and a non-linear filtering process 315 may be performed by communicatively coupled hardware within a device. In some examples, the sensor/lens characterization process 305 may be performed offline. In some cases, illustrated arrows may represent signals or information that may be communicated via electrical connections between device hardware.

A sensor/lens characterization process 305 may involve modeling camera characteristics (i.e. the parameters of a sensor/lens combination) to determine camera-distortion models 320 (e.g., Lens PSF model and sensor PSF model). For example, a sensor/lens characterization process 305 may model blurring and aberration characteristics ($A_L$) due to the lens PSF, as well as blurring and crosstalk characteristics ($A_S$) due to the sensor PSF. A sensor/lens characterization process 305 may also involve modeling CFA sampling characteristics ($A_{CFA}$) to determine one or more CFA sampling models 325. Modeling of $A_L$, $A_S$, and $A_{CFA}$ may refer to modeling or determination of distortion characteristics (e.g., distortions in image capture) associated with a particular lens/sensor/CFA combination. In some cases, aspects of $A_L$, $A_S$, and $A_{CFA}$ may be provided via hardware manufacturer (e.g., via sensor/lens/CFA manufacturer specification), input from a user, or may otherwise be determined by the device (in real time or offline) using raw image data. The convolutional models $A_L$, $A_S$, and $A_{CFA}$ may characterize CFA sampling and camera distortion. In some cases, $A_{CFA}$ may be determined by CFA spectral sampling. Additionally, $A_L$ may be determined by the PSF of the camera lens and may model blurring and chromatic aberration. $A_S$ may be determined by pixel PSF and sensor electrical crosstalk and may model blurring and crosstalk.

A filter optimization process 310 may include combining camera distortion models 320 and CFA sampling models 325 to determine system model 330. A system model 330 may be able to model device parameters (e.g. camera distortion due to sensor lens combination, CFA sampling etc.). For example, filter optimization process 310 may include determining a system model 330 as $A = A_{CFA} \cdot A_L \cdot A_S$. Thus, system model 330, A may characterize CFA sampling and camera distortion. Camera distortion may include blurring, aberration and sensor crosstalk, etc. In some cases, the system model, A may also be referred to as the system matrix. Filter optimization process 310 may also include establishing an Image Prior Model 340 that may be used to determine filter orientation and the extent of desired smoothing. In some cases, an image prior model, $B^{(\gamma)}$, $\sigma_j$ may be a function of multiple variables that may determine filter orientation and the extent of desired smoothing. $B^{(\gamma)}$, may represent a convolutional matrix for orientation $\gamma$ where $\gamma$ may represent desired filter orientations (e.g., $\gamma \in \{H, V\}$, for horizontal and vertical filter orientations). Desired filter orientations may include horizontal, vertical, etc. $\sigma_j$ may represent the smoothness for the luminance channel. It may be selected empirically based on scene luminosity. In, general if the luminosity drops the smoothness may increase. $\{\sigma^j\}_{j=1}^{q-1}$ may represent smoothness for the chroma channels and may be computed using sensor spectral response curves. For RGB images, q=3 and therefore may represent the number of chroma channels present in an image. In general, if the spectral overlap increases the smoothness or color desaturation may also increase. Image Prior Model 340 may be incorporated with System Model 330 to achieve filter parameter optimization 335, a model or optimization that may ultimately be used for non-linear filtering 315 (e.g., for determination of the filtering parameters or the convolution operator used for non-linear filtering 315).

A non-linear filtering process 315 may include filtering raw image data from a sensor (e.g., from a CFA sensor) and may achieve hardware-friendly model-based filtering for image restoration in accordance with the described techniques. Multiple imaging processing tasks 345 may be achieved via the non-linear filtering process 315 (e.g., CFA interpolation, fixed pattern (FP) denoising, chroma denoising, chromatic aberration correction, de-blurring, color desaturation, etc.) as described in more detail above.

Figure 4:
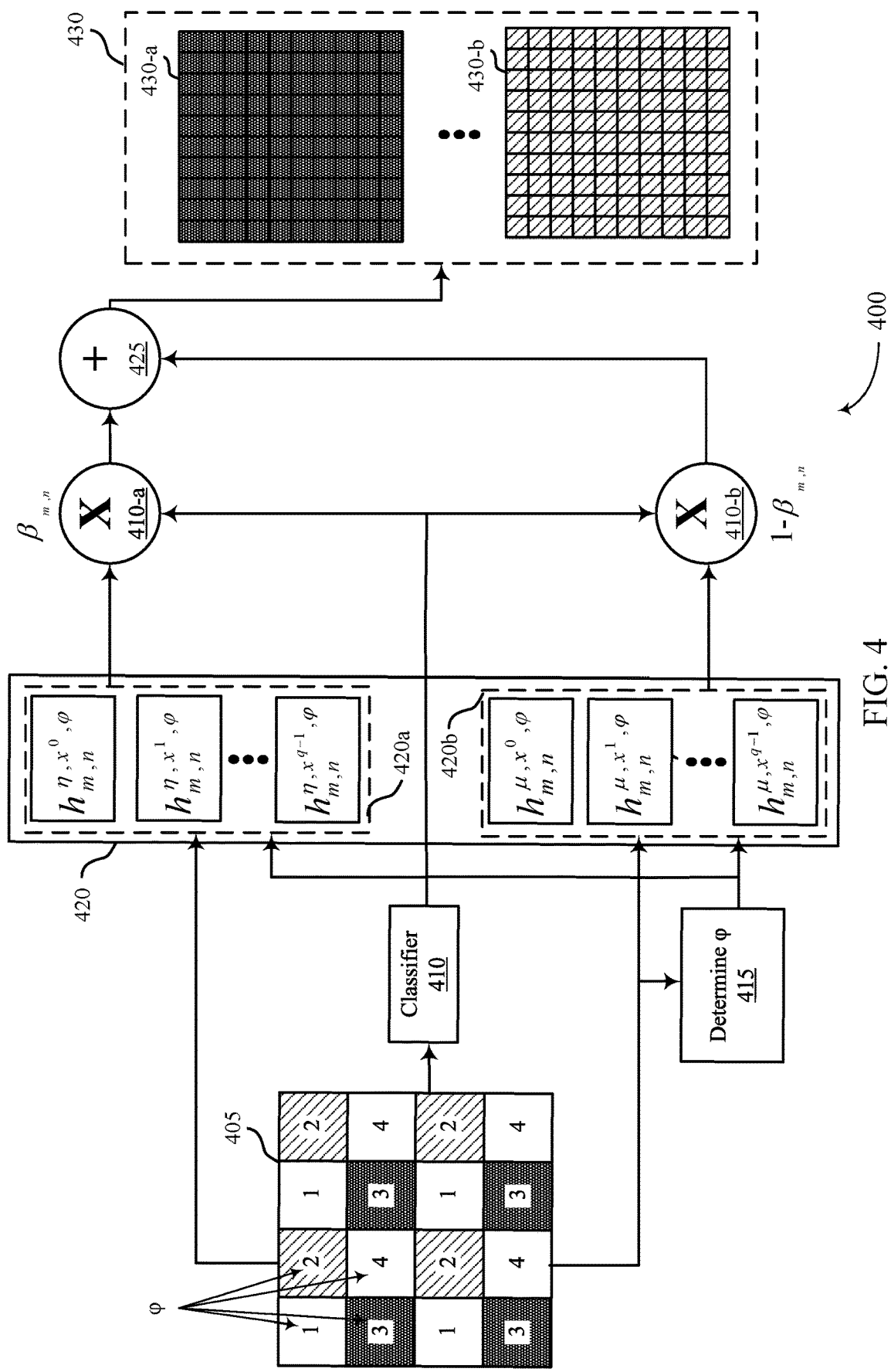
FIG. 4 illustrates an example of an image processing diagram that supports hardware-friendly model-based filtering systems for image restoration in accordance with aspects of the present disclosure.

FIG. 4 illustrates an example of an image processing diagram 400 that supports hardware-friendly model-based filtering systems for image restoration in accordance with aspects of the present disclosure. In some examples, image processing diagram 400 may implement aspects of system 100. Image processing diagram 400 may illustrate image restoration, or filtering, of a local patch 405 using a classifier 410, a set of directional filters 420 (e.g. spectral interpolation filters), and a non-linear combination 425 to achieve the result of restored output 430.

In some examples, raw data from an image sensor (e.g., some sensor/lens combination) may be partitioned into a number of areas or local patches 405 for processing. In some cases, a local patch 405 may correspond to a CFA pattern (e.g., a local patch may be proportional to a CFA pattern used by the image sensor). A classifier 410 may classify the filtered output from the set of directional filters 420 into groups based on the edge orientation of the local patch. The determination of $\varphi$ 415 may identify a pixel in a local patch 405 and may determine its phase (e.g., position) in a CFA pattern. In some examples the set of directional filters 420 may utilize $\varphi$ to define the parameters of individual filters in the set. In some cases, the $\varphi$ may depend on the type of sensor used. In some examples a set of directional filters 420 may include a set of vertical filters 420-a and a set of horizontal filters 420-b. In some cases, directional filters 420 may refer to a set of kernels. A vertical classifier 410-a may be applied to a set of vertical filters 420-a. A horizontal classifier 410-b may be applied to out puts from a set of horizontal filters 420-b. In some cases, the results of directional filters 420 (e.g., following the classification) may be combined by non-linear combination 425.

In a q color-channel CFA, the restored output 430 may include a restored output 430-a (e.g., a restored element of the local patch 405) which may be filtered and binned by a 1st color, a local patch which may be filtered and binned by a second color, etc. up to and including restored output 430-b which may be filtered and binned by a $q^{th}$ color. In some examples the restored output 430 may be sufficiently restored and may be without need for further filtering or processing.

For example, an ISP may include filter a local patch (e.g. a defined area of pixels sampled by a CFA) through a set of non-linear kernels (e.g., through the directional filters 420). For instance, the filtering process may include initially identifying the phase of each pixel in a local patch. A raw image may be filtered with a set of linear kernels. The set of kernels may comprise a set horizontal filters and a set of vertical filters (depending on the number of color channels, or depending on the q-channel CFA sensor used). In general the directional filters 420 may be modeled as rows of a bit matrix (e.g., as rows of a restoration matrix, H). The bit matrix may refer to a convolution operator determined by a CFA interpolation method (e.g., which CFA grid is being used), the amount of spectral overlap between channels (e.g., the amount of spectral overlap between RGB filters), the amount of chromatic aberration, the amount of electrical cross talk, etc. The filters may be configured offline to model sensor dependent CFA sampling and lens dependent distortion. The directional filters 420 may provide for non-iterative (e.g., one-shot) filtering, once the directional filters 420 are determined (e.g., based on properties of the lens and camera, determined offline).

In a three color CFA, each local patch may be processed with 6 directional kernels to produce 6 output values, three vertical outputs, $\hat{R}^V$, $\hat{G}^V$, $\hat{B}^V$ and three horizontal outputs, $\hat{R}^H$, $\hat{G}^H$, $\hat{B}^H$. The results of directional filters may be combined in pairs based on color channel using a non-linear classification operation to produce the output restored data. In a three color-channel CFA the output would be $\hat{R}$, $\hat{G}$, $\hat{B}$ (e.g., where $\hat{R}=\hat{R}^H+\hat{R}^V$, $\hat{G}=\hat{G}^H+\hat{G}^V$, and $\hat{B}=\hat{B}^H+\hat{B}^V$). In general, a channel (e.g., of the q-channel CFA) may be passed through a vertical filter and a horizontal filter. The output pair may then be combined using the non-linear classification mechanism based on the edge orientation ($\beta$). After this process the restored data has undergone demosaicking, deblurring, desaturation, chroma-denoising and correction for both lens aberration and electrical crosstalk artifacts. After a single iteration through the filter there may not be need for further image processing or further iterations.

The present non-linear filtering system may be able to achieve multiple image processing tasks. In some examples these tasks may include, demosaicking, chroma denoising, color desaturation, lens deblurring, fixed pattern noise reduction due to sensor crosstalk, and chromatic aberration correction etc. Filters may be configured to demosaick Bayer, Non-Bayer CFA data, etc. and may be easily tuned using inherent lens and sensor specifications. This may make the system "hardware-friendly" or able to be deployed in a simple manner for a unique camera/lens/CFA ensemble. The non-linear filtering system may be able to yield theoretically optimal image restoration.

Figure 5:
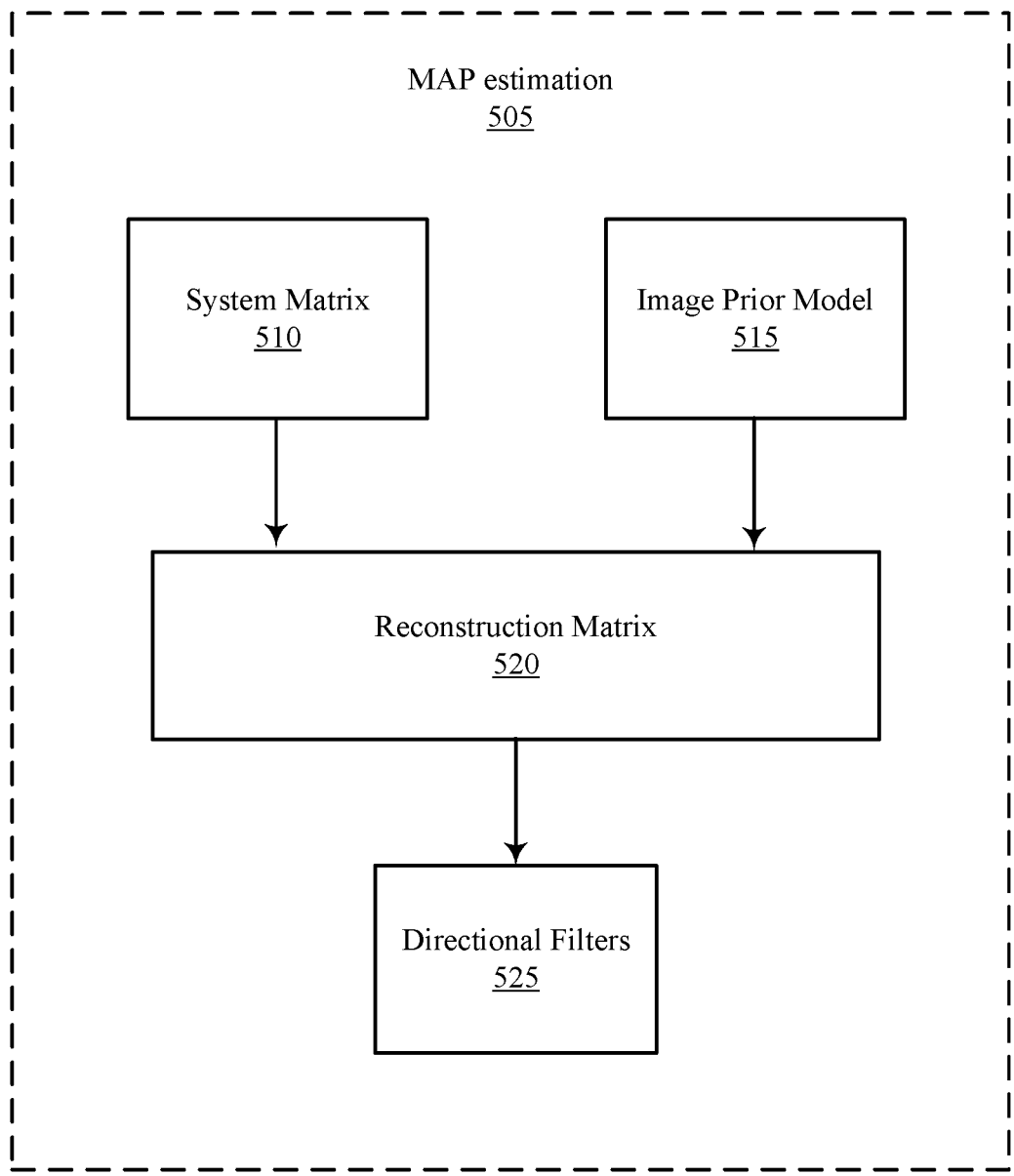
FIG. 5 illustrates an example of a filter estimation diagram that supports hardware-friendly model-based filtering systems for image restoration in accordance with aspects of the present disclosure.

FIG. 5 illustrates an example of a filter estimation diagram 500 that supports hardware-friendly model-based filtering systems for image restoration in accordance with aspects of the present disclosure. In some examples, filter estimation diagram 500 may implement aspects of system 100. Filter estimation diagram 500 may illustrate MAP estimation 505 of a reconstruction matrix 520 based on system matrix 510 (e.g., system model, A) and image prior model 515 (e.g., image prior model, $B^{(\gamma)}$, $\sigma_j$). The reconstruction matrix 520 (e.g., restoration matrix, H) may determine the directional filters 525 (e.g., as each row of the reconstruction matrix may correspond to a directional filter).

Aspects of filter estimation diagram 500 may be performed offline and may include system model 510 determination, image prior model 515 determination, reconstruction matrix 520 determination (e.g., based on system model 510 and image prior model 515 determination), and ultimately directional filters 525 determination. In some examples, a system matrix 510 and an image prior model 515 may be utilized to configure a reconstruction matrix 520. The reconstruction matrix 520 may be disassembled into unique rows that may represent directional filters 525 (e.g., which may refer to directional filters 420).

A convolutional operator (e.g., reconstruction matrix 520, for raw data filtering) may be determined based on one or more properties of the sensor/lens/CFA (e.g., system Matrix 510, A) and an image prior model 515 (e.g., $B^{(\gamma)}$, $\sigma_j$). Filter optimization may include offline MAP estimation 505 to optimize filter parameters without training images. In some cases, optimized filters may be utilized to streamline the demosaicking of raw images captured using any 3- or more-channel CFA sensor. An example of a 3- or more-channel CFA sensor may be but is not limited to an RGB-Bayer CFA, a Hirakawa-Wolfe panchromatic CFA, RGB-CYW CFA or an RGB-Lukac CFA, etc. Models including System Model, A and Image Prior Model, $B^{(\gamma)}$, $\sigma_j$ and a spectral decorrelation transform, $T^j$ may be utilized to configure reconstruction matrix, H in a MAP estimation process where, $$H^{(\gamma)} = \left( A^T A + \sum_{j=0}^{q-1} \frac{1}{\sigma_j^2} T^{jT} B^{(\gamma)} T^j \right)^{-1} A^T \quad [1]$$

In some cases, the unique rows of $H^{(\gamma)}$ may represent unique directional filters for image restoration. An individual filter in the set of optimized demosaick filters may depend on the color channel (e.g. RGB), the phase (i.e. position in the mosaic pattern of the CFA filter), and the orientation (e.g. horizontal, vertical, etc.). Some such filters could be $h_{m,n}^{\gamma,R,\varphi}$, $h_{m,n}^{\gamma,G,\varphi}$, $h_{m,n}^{\gamma,B,\varphi}$, etc. where m, n may be the 2-D spatial coordinates.

An RGB-Bayer CFA, for example, has three color channels, four possible phases, $\varphi$ in the CFA pattern (e.g. $\varphi \in \{0, 1, 2, 3\}$), and 2 possible orientations (e.g. $\gamma \in \{$Horizontal, Vertical$\}$). In this case, $H^{(\gamma)}$ would comprise 24 rows or filters. In some cases, a decorrelation transform, $T^j$ may be constructed so that the correlated spectral components that form the full-resolution image may be mapped to a decorrelated space.

Figure 6:
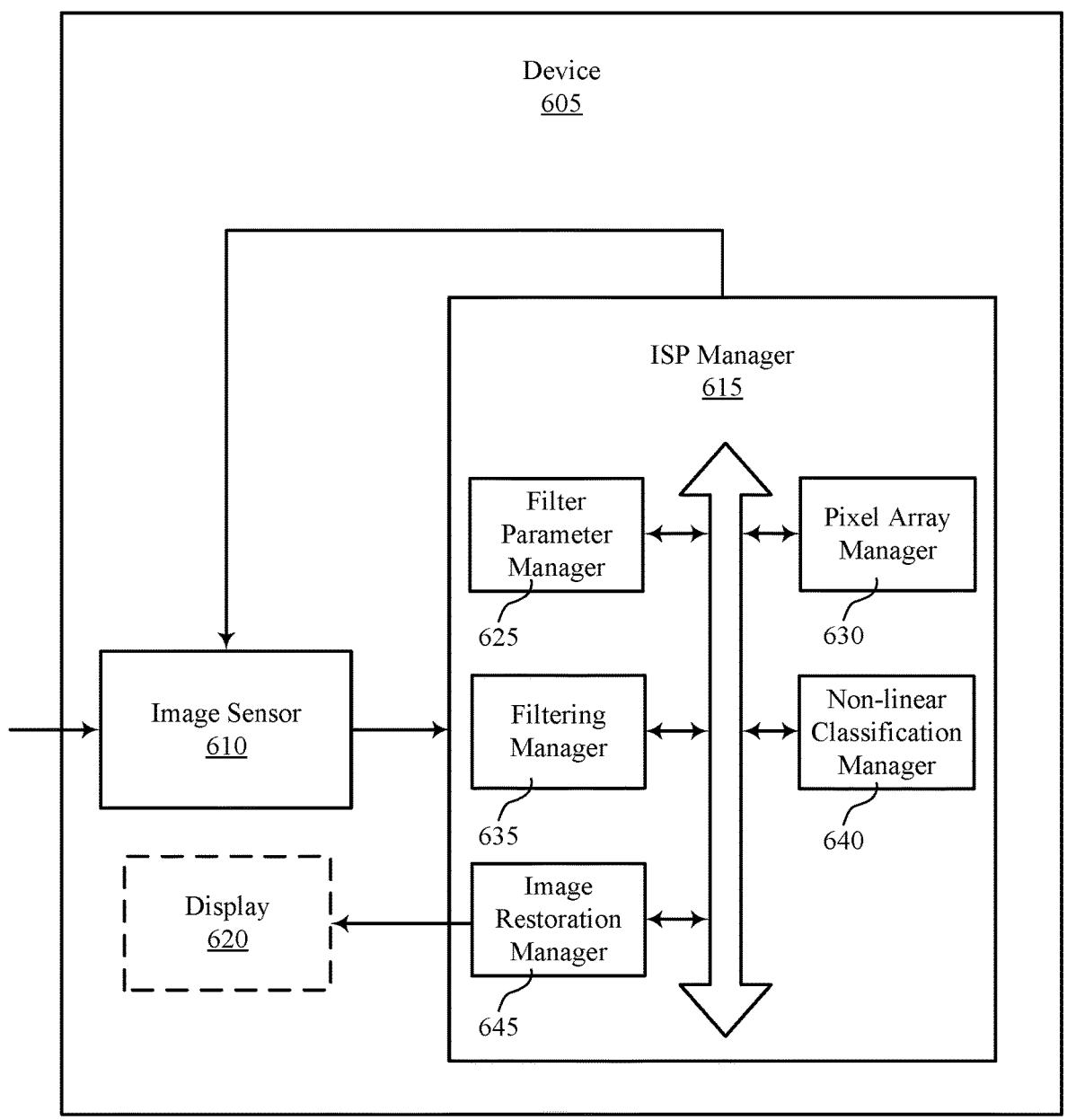
FIGS. 6 and 7 show block diagrams of devices that support hardware-friendly model-based filtering systems for image restoration in accordance with aspects of the present disclosure.

FIG. 6 shows a block diagram 600 of a device 605 that supports hardware-friendly model-based filtering systems for image restoration in accordance with aspects of the present disclosure. The device 605 may be an example of aspects of a device as described herein. The device 605 may include an image sensor 610, an ISP manager 615, and, in some cases, a display 620. The device 605 may also include a processor. Each of these components may be in communication with one another (e.g., via one or more buses).

The image sensor 610 (e.g., a camera) may receive information (e.g., light), which may be passed on to other components of the device 605. In some cases, the image sensor 610 may be an example of aspects of the I/O controller 715 described with reference to FIG. 7. As discussed above, the image sensor 610 may utilize one or more photosensitive elements that have a sensitivity to a spectrum of electromagnetic radiation to receive such information (e.g., to receive a pixel intensity value, RGB values of a pixel, etc.). Information may be passed on to other components of the device 605.

The ISP manager 615 may identify a camera lens and a CFA sensor, determine a convolutional operator based on the camera lens and the CFA sensor, identify a pixel array representing an image, filter a local patch of the pixel array using a set of horizontal filters and a set of vertical filters based on the convolutional operator, combine at least two results of the filtering based on a non-linear classification operation, and output a restored image based on the combining. In some cases, the ISP manager may output the restored image to the display 620. The ISP manager 615 may be an example of aspects of the ISP manager 710 described herein.

The ISP manager 615, or its sub-components, may be implemented in hardware, code (e.g., software or firmware) executed by a processor, or any combination thereof. If implemented in code executed by a processor, the functions of the ISP manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The ISP manager 615, or its sub-components, may be physically located at various positions, including being distributed such that portions of functions are implemented at different physical locations by one or more physical components. In some examples, the ISP manager 615, or its sub-components, may be a separate and distinct component in accordance with various aspects of the present disclosure. In some examples, the ISP manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The ISP manager 615 may be an example of aspects of the ISP manager 710 as described herein. The ISP manager 615 may include a filter parameter manager 625, a pixel array manager 630, a filtering manager 635, a non-linear classification manager 640, and an image restoration manager 645. Each of these modules may communicate, directly or indirectly, with one another (e.g., via one or more buses).

The filter parameter manager 625 may identify a camera lens and a CFA sensor. In some examples, the filter parameter manager 625 may determine a convolutional operator based on the camera lens and the CFA sensor. In some examples, the filter parameter manager 625 may identify a second camera lens, a second CFA sensor, or both. In some examples, the filter parameter manager 625 may modify the convolutional operator based on the second camera lens, the second CFA sensor, or both. In some examples, modifying the convolutional operator includes updating hardware registers in an ISP. In some cases, the filtering (e.g., performed by filtering manager 635) is based on the modified convolutional operator.

In some examples, the filter parameter manager 625 may identify a tuning parameter for each filter of the set of horizontal filters and the set of vertical filters based on one or more properties associated with the camera lens or the CFA sensor, where the one or more properties include one or more of a lens PSF, a lens chromatic aberration parameter, a sensor pixel PSF, a sensor crosstalk parameter, a sensor spectral overlap parameter, or some combination thereof. In some examples, the filter parameter manager 625 may determine the convolutional operator is based on a correction including one or more of a chromatic aberration correction, a blurring correction, a cross talk correction, or some combination thereof, where the correction is associated with the camera lens or the CFA sensor.

The pixel array manager 630 may identify a pixel array representing an image.

The filtering manager 635 may filter a local patch of the pixel array using a set of horizontal filters and a set of vertical filters based on the convolutional operator. In some examples, the filtering manager 635 may filter a set of red, green, blue values through the set of horizontal filters to produce a first red value, a first green value, and a first blue value. In some examples, the filtering manager 635 may filter the set of red, green, blue values through the set of vertical filters to produce a second red value, a second green value, and a second blue value.

The non-linear classification manager 640 may combine at least two results of the filtering based on a non-linear classification operation. In some examples, the non-linear classification manager 640 may combine the first red value and the second red value based on the non-linear classification operation. In some examples, the non-linear classification manager 640 may combine the first green value and the second green value based on the non-linear classification operation. In some examples, the non-linear classification manager 640 may combine the first blue value and the second blue value based on the non-linear classification operation. In some cases, the non-linear classification operation is based on an edge orientation associated with the local patch.

The image restoration manager 645 may output a restored image based on the combining.

Figure 7:
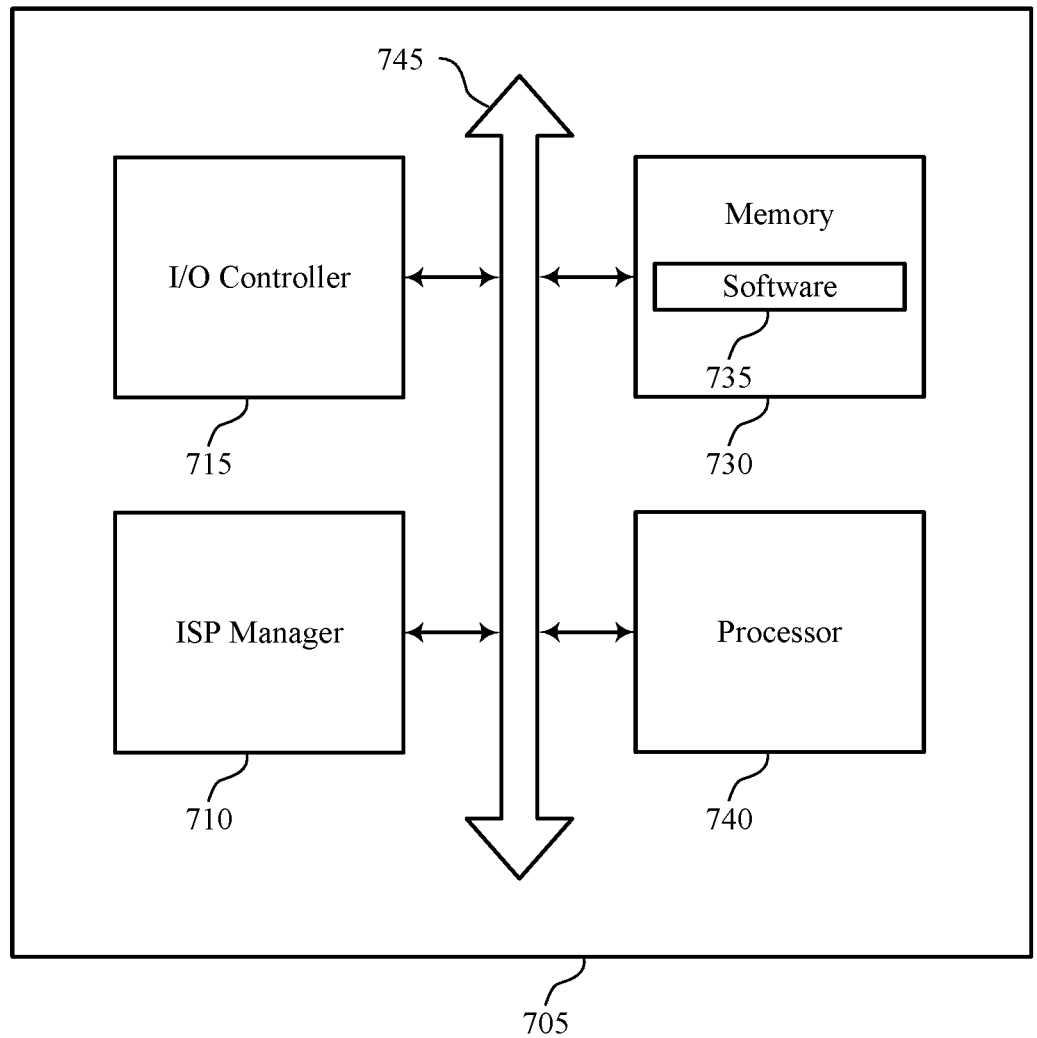

FIG. 7 shows a diagram of a system 700 including a device 705 that supports hardware-friendly model-based filtering systems for image restoration in accordance with aspects of the present disclosure. The device 705 may be an example of or include the components of device 605, or a device 102 as described herein. In some cases, the device 705 may include components such as, for example, an ISP manager 710, an I/O controller 715, memory 730, and a processor 740. These components may be in electronic communication via one or more buses (e.g., bus 745).

The ISP manager 710 may identify a camera lens and a CFA sensor, determine a convolutional operator based on the camera lens and the CFA sensor, identify a pixel array representing an image, filter a local patch of the pixel array using a set of horizontal filters and a set of vertical filters based on the convolutional operator, combine at least two results of the filtering based on a non-linear classification operation, and output a restored image based on the combining.

The I/O controller 715 may manage input (e.g., pixel intensity values and/or RGB values of a pixel at an image sensor) and output signals (e.g., representing restored images) for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715. In some cases, the I/O controller 715 may refer to an image sensor 105, an image sensor 610, a camera, a light sensor, etc.

The memory 730 may include RAM and ROM. The memory 730 may store computer-readable, computer-executable code or software 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting hardware-friendly model-based filtering system for image restoration).

The software 735 may include instructions to implement aspects of the present disclosure, including instructions to support image processing. The software 735 may be stored in a non-transitory computer-readable medium such as system memory or other type of memory. In some cases, the software 735 may not be directly executable by the processor 740 but may cause a computer (e.g., when compiled and executed) to perform functions described herein.

Figure 8:
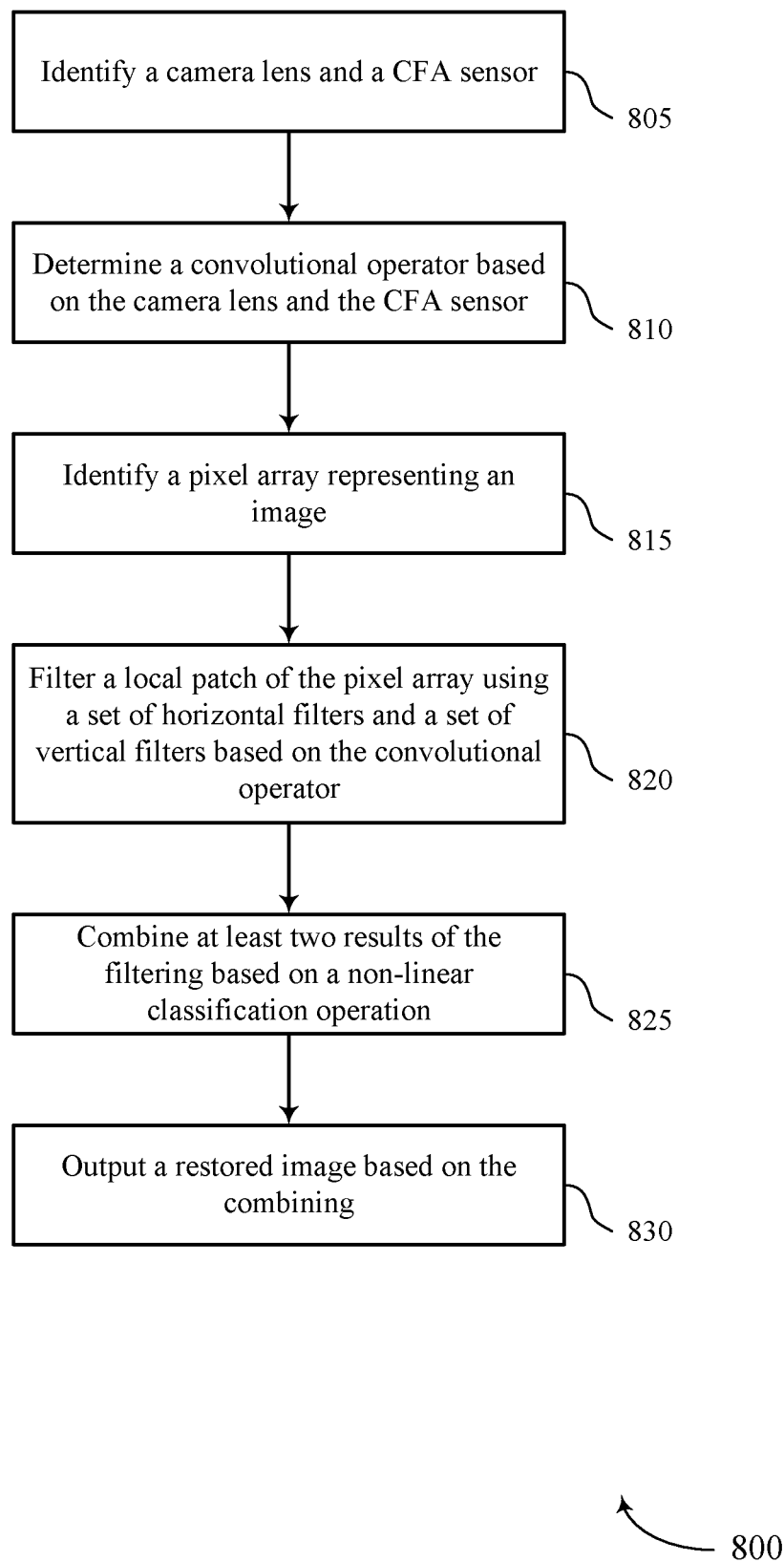
FIGS. 8 and 9 show flowcharts illustrating methods that support hardware-friendly model-based filtering systems for image restoration in accordance with aspects of the present disclosure.

FIG. 8 shows a flowchart illustrating a method 800 that supports hardware-friendly model-based filtering systems for image restoration in accordance with aspects of the present disclosure. The operations of method 800 may be implemented by a device or its components as described herein. For example, the operations of method 800 may be performed by an ISP manager as described with reference to FIGS. 6 through 7. In some examples, a device may execute a set of instructions to control the functional elements of the device to perform the functions described below. Additionally or alternatively, a device may perform aspects of the functions described below using special-purpose hardware.

At 805, the device may identify a camera lens and a CFA sensor. The operations of 805 may be performed according to the methods described herein. In some examples, aspects of the operations of 805 may be performed by a filter parameter manager as described with reference to FIGS. 6 through 7.

At 810, the device may determine a convolutional operator based on the camera lens and the CFA sensor. The operations of 810 may be performed according to the methods described herein. In some examples, aspects of the operations of 810 may be performed by a filter parameter manager as described with reference to FIGS. 6 through 7.

At 815, the device may identify a pixel array representing an image. The operations of 815 may be performed according to the methods described herein. In some examples, aspects of the operations of 815 may be performed by a pixel array manager as described with reference to FIGS. 6 through 7.

At 820, the device may filter a local patch of the pixel array using a set of horizontal filters and a set of vertical filters based on the convolutional operator. The operations of 820 may be performed according to the methods described herein. In some examples, aspects of the operations of 820 may be performed by a filtering manager as described with reference to FIGS. 6 through 7.

At 825, the device may combine at least two results of the filtering based on a non-linear classification operation. The operations of 825 may be performed according to the methods described herein. In some examples, aspects of the operations of 825 may be performed by a non-linear classification manager as described with reference to FIGS. 6 through 7.

At 830, the device may output a restored image based on the combining. The operations of 830 may be performed according to the methods described herein. In some examples, aspects of the operations of 830 may be performed by an image restoration manager as described with reference to FIGS. 6 through 7.

Figure 9:
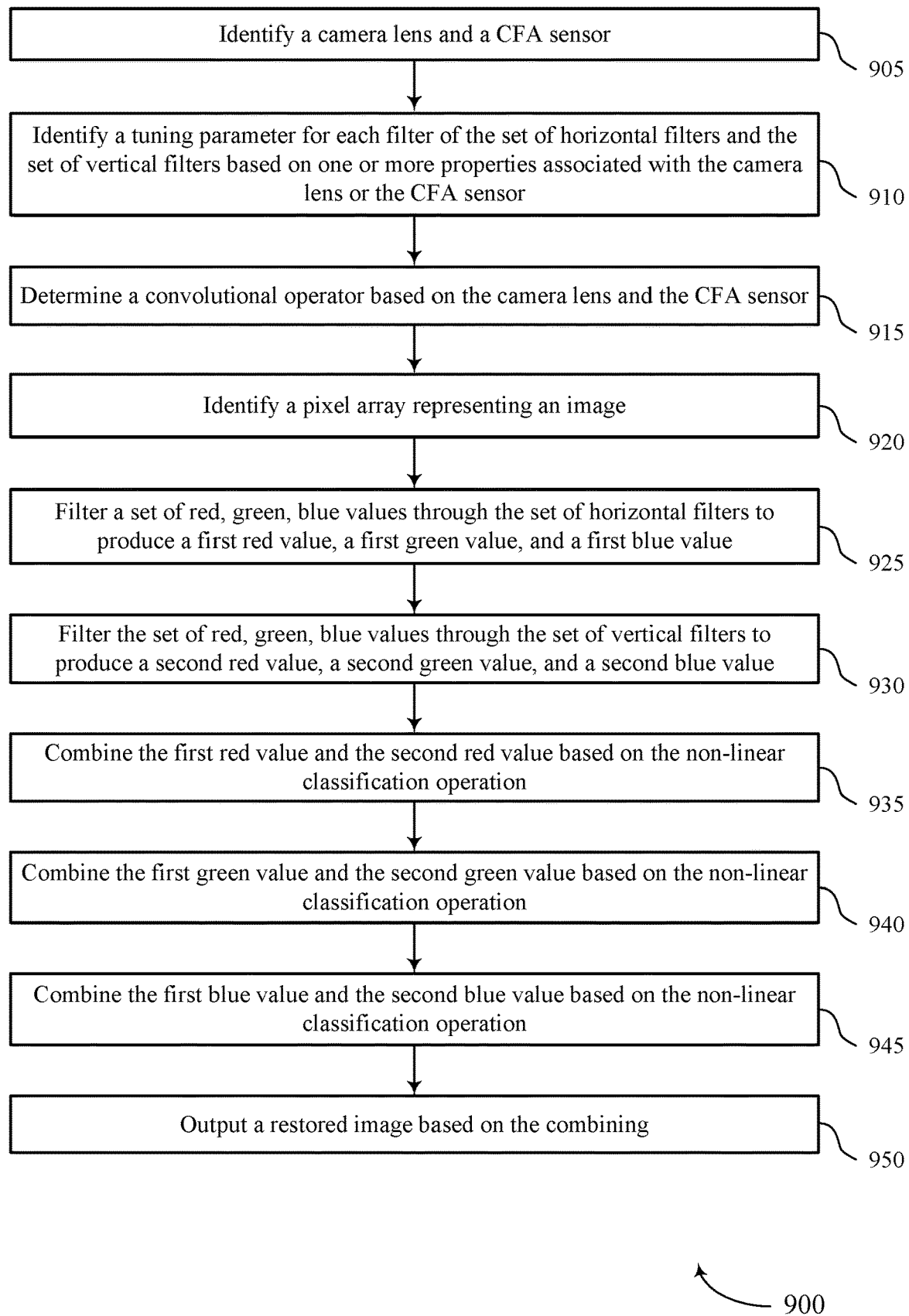

FIG. 9 shows a flowchart illustrating a method 900 that supports hardware-friendly model-based filtering systems for image restoration in accordance with aspects of the present disclosure. The operations of method 900 may be implemented by a device or its components as described herein. For example, the operations of method 900 may be performed by an ISP manager as described with reference to FIGS. 6 through 7. In some examples, a device may execute a set of instructions to control the functional elements of the device to perform the functions described below. Additionally or alternatively, a device may perform aspects of the functions described below using special-purpose hardware.

At 905, the device may identify a camera lens and a CFA sensor. The operations of 905 may be performed according to the methods described herein. In some examples, aspects of the operations of 905 may be performed by a filter parameter manager as described with reference to FIGS. 6 through 7.

At 910, the device may identify a tuning parameter for each filter of the set of horizontal filters and the set of vertical filters based on one or more properties associated with the camera lens or the CFA sensor. In some examples, the one or more properties include one or more of a lens PSF, a lens chromatic aberration parameter, a sensor pixel PSF, a sensor crosstalk parameter, a sensor spectral overlap parameter, or some combination thereof. The operations of 910 may be performed according to the methods described herein. In some examples, aspects of the operations of 910 may be performed by a filter parameter manager as described with reference to FIGS. 6 through 7.

At 915, the device may determine a convolutional operator based on the camera lens and the CFA sensor. The operations of 915 may be performed according to the methods described herein. In some examples, aspects of the operations of 915 may be performed by a filter parameter manager as described with reference to FIGS. 6 through 7.

At 920, the device may identify a pixel array representing an image. The operations of 920 may be performed according to the methods described herein. In some examples, aspects of the operations of 920 may be performed by a pixel array manager as described with reference to FIGS. 6 through 7.

At 925, the device may filter a set of red, green, blue values through the set of horizontal filters to produce a first red value, a first green value, and a first blue value. The operations of 925 may be performed according to the methods described herein. In some examples, aspects of the operations of 925 may be performed by a filtering manager as described with reference to FIGS. 6 through 7.

At 930, the device may filter the set of red, green, blue values through the set of vertical filters to produce a second red value, a second green value, and a second blue value. The operations of 930 may be performed according to the methods described herein. In some examples, aspects of the operations of 930 may be performed by a filtering manager as described with reference to FIGS. 6 through 7.

At 935, the device may combine the first red value and the second red value based on the non-linear classification operation. The operations of 935 may be performed according to the methods described herein. In some examples, aspects of the operations of 935 may be performed by a non-linear classification manager as described with reference to FIGS. 6 through 7.

At 940, the device may combine the first green value and the second green value based on the non-linear classification operation. The operations of 940 may be performed according to the methods described herein. In some examples, aspects of the operations of 940 may be performed by a non-linear classification manager as described with reference to FIGS. 6 through 7.

At 945, the device may combine the first blue value and the second blue value based on the non-linear classification operation. The operations of 945 may be performed according to the methods described herein. In some examples, aspects of the operations of 945 may be performed by a non-linear classification manager as described with reference to FIGS. 6 through 7.

At 950, the device may output a restored image based on the combining. The operations of 950 may be performed according to the methods described herein. In some examples, aspects of the operations of 950 may be performed by an image restoration manager as described with reference to FIGS. 6 through 7.

It should be noted that the methods described herein describe possible implementations, and that the operations and the steps may be rearranged or otherwise modified and that other implementations are possible. Further, aspects from two or more of the methods may be combined.

Information and signals described herein may be represented and exchanged (e.g., between components of a device) using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for image processing, comprising:
   identifying a camera lens and a color filter array (CFA) sensor;
   determining a convolutional operator based at least in part on the camera lens and the CFA sensor;
   sampling a local patch of a pixel array representing an image using the CFA sensor;
   filtering the sampled local patch of the pixel array using a set of horizontal filters and a set of vertical filters based at least in part on the convolutional operator;
   combining at least two results of the filtering based at least in part on a non-linear classification operation; and
   outputting a restored image based at least in part on the combining.

2. The method of claim 1, wherein filtering the sampled local patch of the pixel array comprises:
   filtering a set of red, green, blue values through the set of horizontal filters to produce a first red value, a first green value, and a first blue value; and
   filtering the set of red, green, blue values through the set of vertical filters to produce a second red value, a second green value, and a second blue value.

3. The method of claim 2, wherein combining the at least two results of the filtering further comprises:
   combining the first red value and the second red value based at least in part on the non-linear classification operation;
   combining the first green value and the second green value based at least in part on the non-linear classification operation; and
   combining the first blue value and the second blue value based at least in part on the non-linear classification operation.

4. The method of claim 3, wherein the non-linear classification operation is based at least in part on an edge orientation associated with the sampled local patch.

5. The method of claim 1, further comprising:
   identifying a second camera lens, a second CFA sensor, or both; and
   modifying the convolutional operator based at least in part on the second camera lens, the second CFA sensor, or both.

6. The method of claim 5, wherein:
   modifying the convolutional operator comprises updating hardware registers in an image signal processor (ISP).

7. The method of claim 5, wherein the filtering is based at least in part on the modified convolutional operator.

8. The method of claim 1, wherein determining the convolutional operator further comprises:
   identifying a tuning parameter for each filter of the set of horizontal filters and the set of vertical filters based at least in part on one or more properties associated with the camera lens or the CFA sensor, wherein the one or more properties comprise one or more of: a lens point spread function (PSF), a lens chromatic aberration parameter, a sensor pixel PSF, a sensor crosstalk parameter, a sensor spectral overlap parameter, or some combination thereof.

9. The method of claim 1, wherein:
   determining the convolutional operator is based at least in part on a correction comprising one or more of: a chromatic aberration correction, a blurring correction, a cross talk correction, or some combination thereof; wherein the correction is associated with the camera lens or the CFA sensor.

10. An apparatus for image processing, comprising:
    a processor,
    memory in electronic communication with the processor; and
    instructions stored in the memory and executable by the processor to cause the apparatus to:
    identify a camera lens and a color filter array (CFA) sensor;
    determine a convolutional operator based at least in part on the camera lens and the CFA sensor;
    sample a local patch of a pixel array representing an image using the CFA sensor;
    filter the sampled local patch of the pixel array using a set of horizontal filters and a set of vertical filters based at least in part on the convolutional operator;
    combine at least two results of the filtering based at least in part on a non-linear classification operation; and
    output a restored image based at least in part on the combining.

11. The apparatus of claim 10, wherein the instructions to filter the sampled local patch of the pixel array are executable by the processor to cause the apparatus to:
    filter a set of red, green, blue values through the set of horizontal filters to produce a first red value, a first green value, and a first blue value; and
    filter the set of red, green, blue values through the set of vertical filters to produce a second red value, a second green value, and a second blue value.

12. The apparatus of claim 11, wherein the instructions to combine the at least two results of the filtering further are executable by the processor to cause the apparatus to:
    combine the first red value and the second red value based at least in part on the non-linear classification operation;
    combine the first green value and the second green value based at least in part on the non-linear classification operation; and combine the first blue value and the second blue value based at least in part on the non-linear classification operation.

13. The apparatus of claim 12, wherein the non-linear classification operation is based at least in part on an edge orientation associated with the sampled local patch.

14. The apparatus of claim 10, wherein the instructions are further executable by the processor to cause the apparatus to:
identify a second camera lens, a second CFA sensor, or both; and
modify the convolutional operator based at least in part on the second camera lens, the second CFA sensor, or both.

15. The apparatus of claim 14, wherein the instructions to modify the convolutional operator are executable by the processor to cause the apparatus to update hardware registers in an image signal processor (ISP).

16. The apparatus of claim 14, wherein the filtering is based at least in part on the modified convolutional operator.

17. The apparatus of claim 10, wherein the instructions to determine the convolutional operator further are executable by the processor to cause the apparatus to:
identify a tuning parameter for each filter of the set of horizontal filters and the set of vertical filters based at least in part on one or more properties associated with the camera lens or the CFA sensor, wherein the one or more properties comprise one or more of: a lens point spread function (PSF), a lens chromatic aberration parameter, a sensor pixel PSF, a sensor crosstalk parameter, a sensor spectral overlap parameter, or some combination thereof.

18. The apparatus of claim 10, wherein determining the convolutional operator is based at least in part on a correction comprising one or more of: a chromatic aberration correction, a blurring correction, a cross talk correction, or some combination thereof; wherein the correction is associated with the camera lens or the CFA sensor.

19. An apparatus for image processing, comprising:
means for identifying a camera lens and a color filter array (CFA) sensor;
means for determining a convolutional operator based at least in part on the camera lens and the CFA sensor;
means for sampling a local patch of a pixel array representing an image using the CFA sensor;
means for filtering the sampled local patch of the pixel array using a set of horizontal filters and a set of vertical filters based at least in part on the convolutional operator;
means for combining at least two results of the filtering based at least in part on a non-linear classification operation; and
means for outputting a restored image based at least in part on the combining.

20. The apparatus of claim 19, wherein the means for filtering the sampled local patch of the pixel array comprises:
means for filtering a set of red, green, blue values through the set of horizontal filters to produce a first red value, a first green value, and a first blue value; and
means for filtering the set of red, green, blue values through the set of vertical filters to produce a second red value, a second green value, and a second blue value.

* * * * *